(12) United States Patent
Uenomachi et al.

(10) Patent No.: US 10,901,451 B2
(45) Date of Patent: Jan. 26, 2021

(54) INPUT DEVICE

(71) Applicant: Alps Alpine Co., Ltd., Tokyo (JP)

(72) Inventors: Takashi Uenomachi, Miyagi-ken (JP);
Toshio Ogawa, Miyagi-ken (JP);
Shinya Muto, Miyagi-ken (JP);
Yoshitsugu Wakita, Miyagi-ken (JP);
Ikuyasu Miyako, Miyagi-ken (JP);
Wataru Kimura, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 16/994,719

(22) Filed: Aug. 17, 2020

(65) Prior Publication Data

US 2020/0379500 A1 Dec. 3, 2020

Related U.S. Application Data

(63) Continuation of application No. PCT/JP2019/005119, filed on Feb. 13, 2019.

(30) Foreign Application Priority Data

Mar. 19, 2018 (JP) .................................. 2018-051380

(51) Int. Cl.
*G05G 1/08* (2006.01)
*G05G 25/00* (2006.01)
(Continued)

(52) U.S. Cl.
CPC .............. *G05G 5/03* (2013.01); *F16H 1/203* (2013.01); *G05G 1/08* (2013.01); *G05G 2505/00* (2013.01)

(58) Field of Classification Search
CPC .... B60K 37/06; B60K 2370/126; G05G 1/10; G05G 1/08; G05G 25/00; G05G 5/03; G05G 2505/00; G06F 3/01; F16H 1/203
See application file for complete search history.

(56) References Cited

U.S. PATENT DOCUMENTS 5,180,051 A * 1/1993 Cook .................... H01H 89/08
200/400
5,271,896 A * 12/1993 Jakubowicz ..... G01N 35/00029
221/226

(Continued)

FOREIGN PATENT DOCUMENTS

JP H0526330 A * 2/1993
WO WO 2019/181287 A1 * 9/2019 ............... G05G 5/03

OTHER PUBLICATIONS

International Search Report for corresponding International Application No. PCT/JP2019/005119 dated May 14, 2019 (4 pages) with English translation.

*Primary Examiner* — Vinh Luong
(74) *Attorney, Agent, or Firm* — Harness, Dickey & Pierce, P.L.C.

(57) ABSTRACT

An input device includes a base member, a motor, a rotation shaft, a worm gear, a first gear, a rotor, a movement member, an elastic member, a change amount detection unit, and a controller. The rotation shaft is rotated by the motor. The worm gear is rotated by the rotation shaft. The first gear is rotatable and engaged with the worm gear. The rotor is rotatable relative to the base member, includes a second gear engaged with the first gear, and is rotated by an operator. The movement member is moved as the worm gear is moved. The elastic member generates urging force. The change amount detection unit detects a change amount of a state that is changed in accordance with the movement of the movement member. The controller performs drive control for the motor to change a sense of force applied to the operator.

7 Claims, 13 Drawing Sheets

(51) Int. Cl.
*G05G 5/03* (2008.04)
*G06F 3/01* (2006.01)
*F16H 1/20* (2006.01)

(56) References Cited

U.S. PATENT DOCUMENTS

| | | |
|---|---|---|
| 2007/0159307 A1 | 7/2007 | Jannasch et al. |
| 2012/0227526 A1* | 9/2012 | Lescorail .............. F16H 57/022 |
| | | 74/406 |
| 2015/0285351 A1 | 10/2015 | Rake et al. |
| 2017/0175883 A1 | 6/2017 | Watanabe |
| 2018/0073627 A1* | 3/2018 | Gibbs ...................... F16H 1/16 |
| 2020/0166122 A1* | 5/2020 | Yamamoto .............. F16H 61/24 |
| 2020/0191259 A1* | 6/2020 | Bagley .................... F16H 59/02 |

\* cited by examiner

US 10,901,451 B2

INPUT DEVICE

CROSS REFERENCE TO RELATED APPLICATIONS

This application is a Continuation of International Application No. PCT/JP2019/005119 filed on Feb. 13, 2019, which claims benefit of Japanese Patent Application No. 2018-051380 filed on Mar. 19, 2018. The entire contents of each application noted above are hereby incorporated by reference.

BACKGROUND OF THE INVENTION

1. Field of the Invention

The present invention relates to an input device.

2. Description of the Related Art

There is provided a related-art sense of force generation input device that includes a shaft portion, a motor, a means for detecting rotation. The shaft portion holds an operation knob and is rotatably held by a bearing portion. The motor includes a motor shaft. The means for detecting rotation detects rotation of the operation knob. The shaft portion and the motor shaft are arranged beside each other. The sense of force generation input device also includes a first gear and a second gear. The first gear is attached to the shaft portion so as to be rotated by the operation knob. The second gear is rotated by the first gear and attached to the motor shaft. A sense of force from the motor is transmitted to the operation knob via the first and second gears (for example, see Japanese Unexamined Patent Application Publication No. 2003-022137).

SUMMARY OF THE INVENTION

The related-art sense of force generation input device generates the sense of force transmitted to the operator only with torque generated by the motor. Thus, the motor is required to generate large torque for transmitting the sense of force to the operator. Accordingly, there is a problem in that the size of the device increases.

Accordingly, a size-reduced input device is provided.

An input device according to an embodiment of the present invention includes a base member, a motor, a rotation shaft, a worm gear, a first gear, a rotor, a movement member, an elastic member, a change amount detection unit, and a controller. The motor is attached to the base member. The rotation shaft is configured to be rotated by the motor. The worm gear is configured to be rotated by the rotation shaft and attached to the rotation shaft so as to be movable in an axial direction of the rotation shaft. The first gear is provided so as to be rotatable relative to the base member and engaged with the worm gear. The rotor is provided so as to be rotatable relative to the base member, includes a second gear engaged with the first gear, and is configured to undergo rotation operation by an operator. The movement member is configured to be moved as the worm gear is moved in the axial direction. The elastic member is configured to generate urging force in a direction in which the movement of the movement member is suppressed in accordance with a movement amount of the movement member. The change amount detection unit is configured to detect a change amount of a state that is changed in accordance with the movement of the movement member. The controller is configured to perform drive control for the motor to change a sense of force applied to the operator via the rotor in accordance with the change amount detected by the change amount detection unit.

The size-reduced input device can be provided.

DESCRIPTION OF THE PREFERRED EMBODIMENTS

An embodiment to which an input device according to the present invention is applied will be described.

Embodiment

Figure 1:
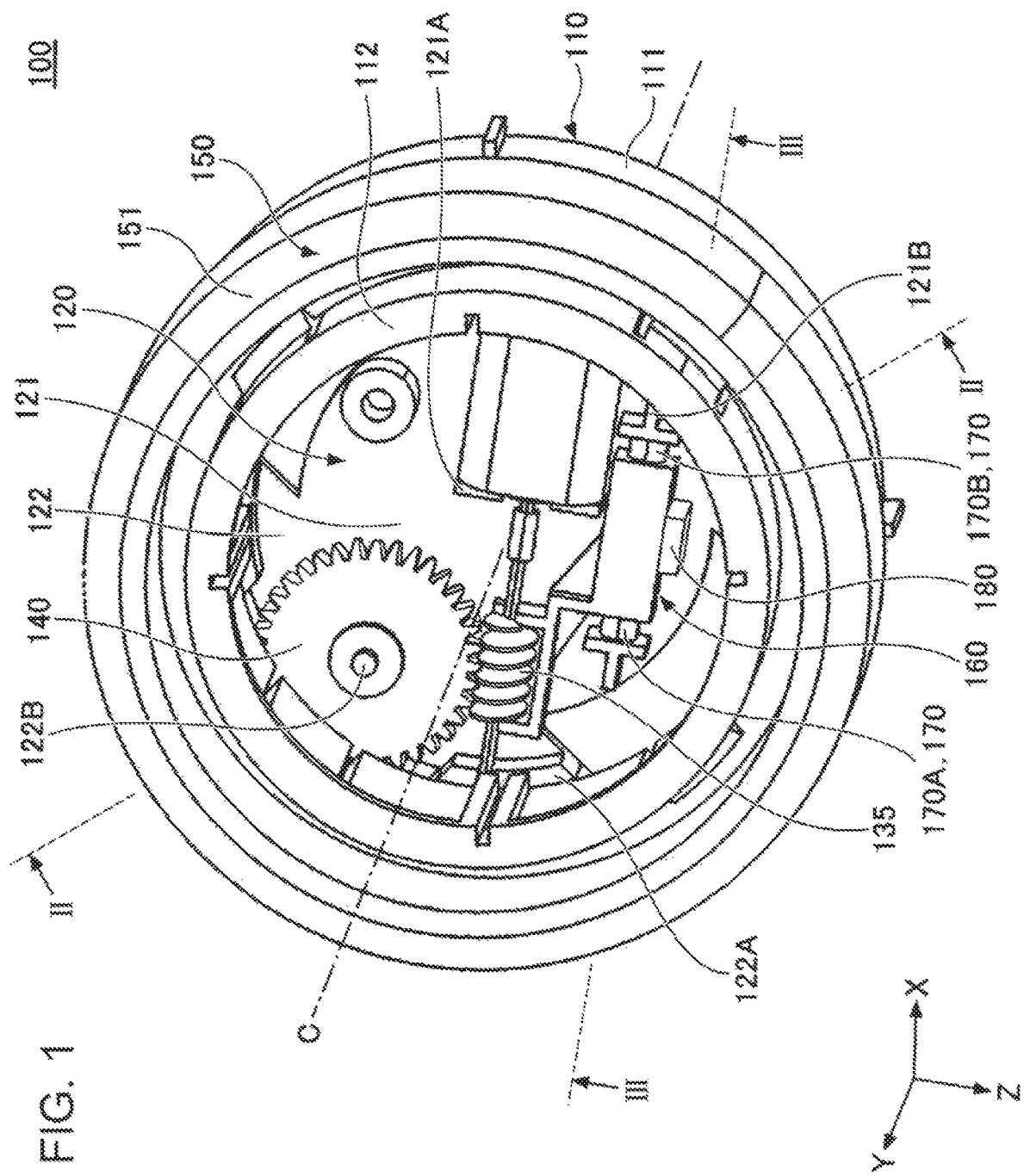
FIG. 1 is a perspective view illustrating an input device according to an embodiment.
Figure 2:
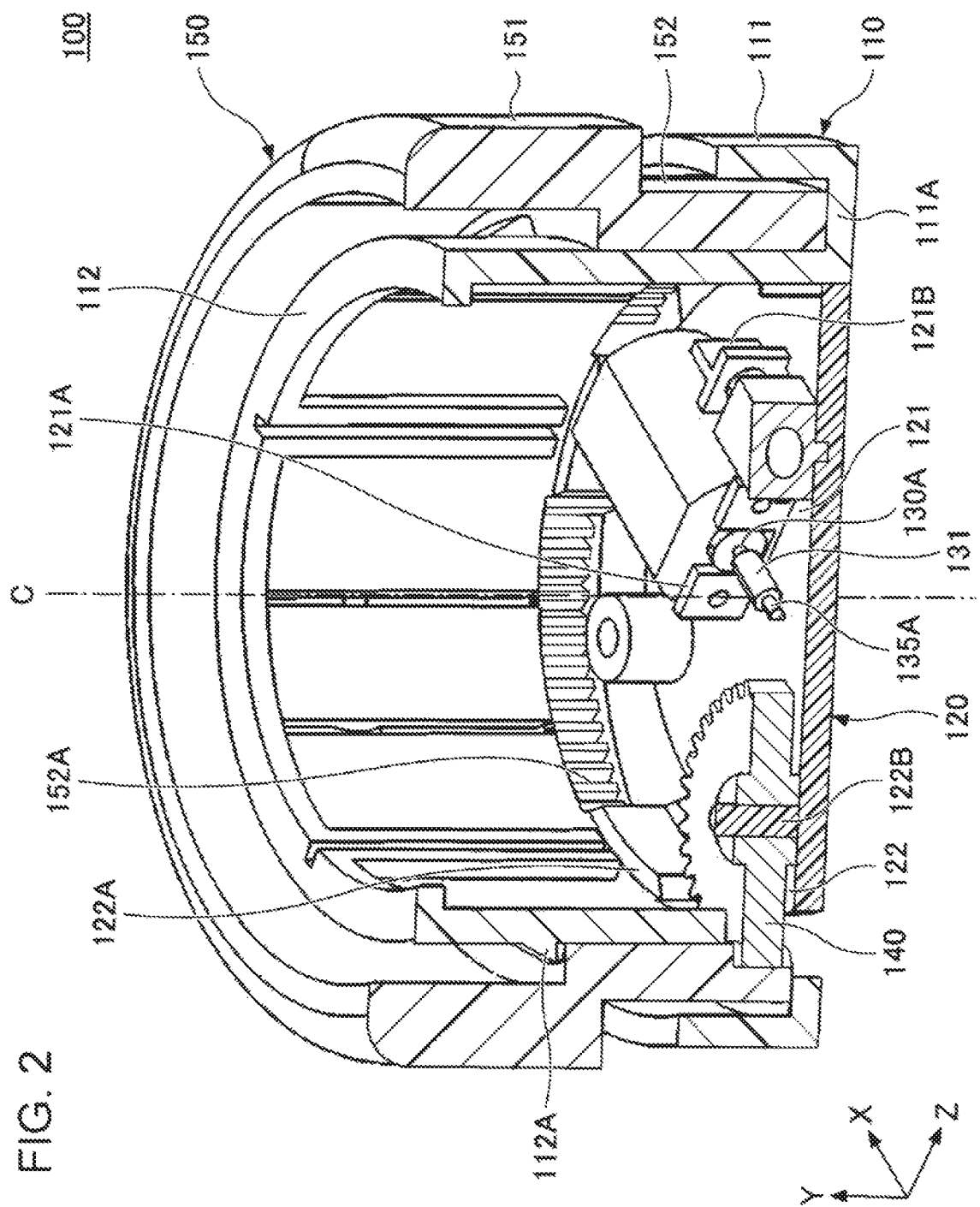
FIG. 2 illustrates a sectional view taken along line II-II in FIG. 1, looking in the direction of arrows.
Figure 3:
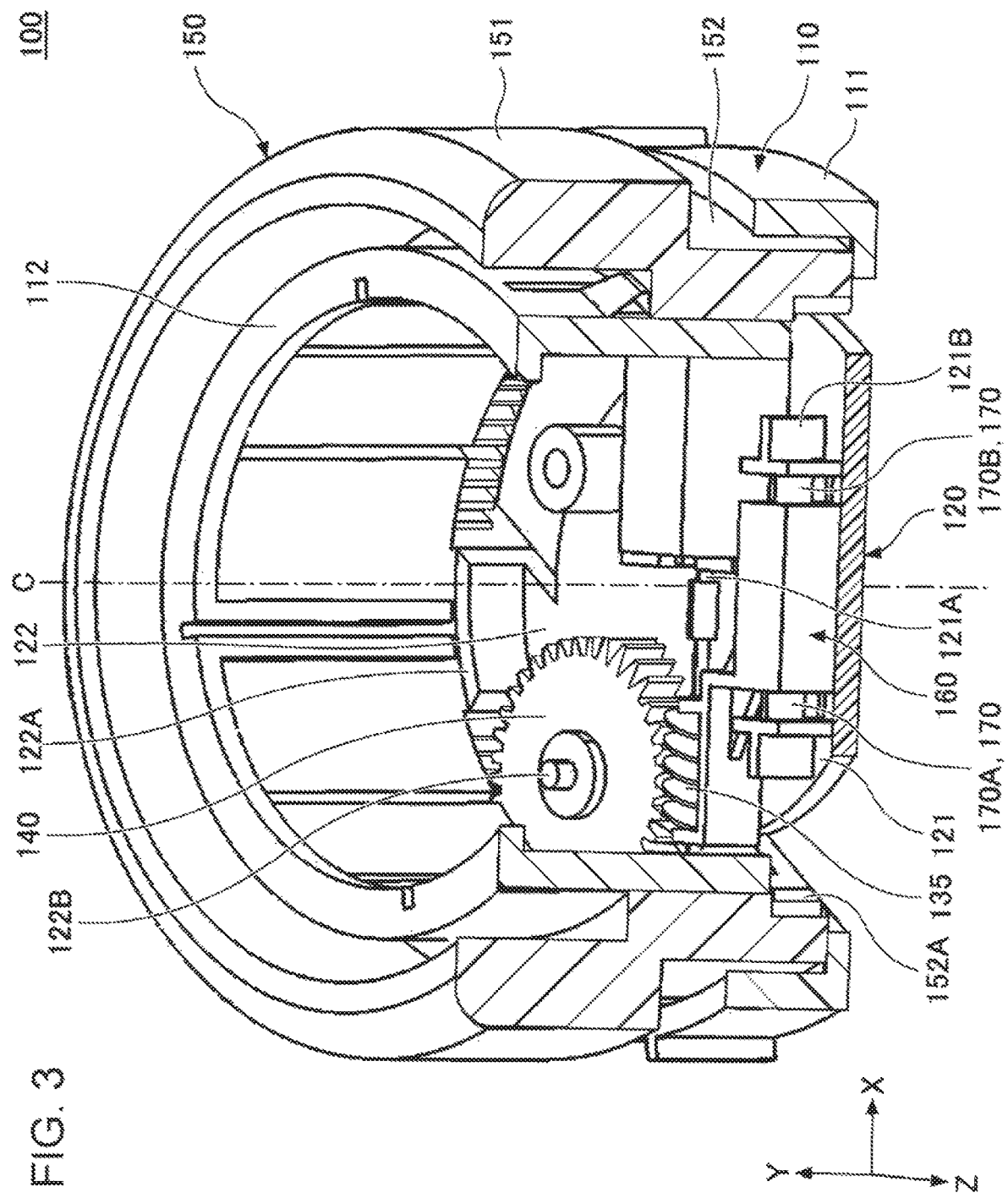
FIG. 3 illustrates a sectional view taken along line III-III in FIG. 1, looking in the direction of arrows.

FIG. 1 is a perspective view illustrating an input device 100 according to an embodiment. FIG. 2 illustrates a sectional view taken along line II-II in FIG. 1, looking in the direction of arrows. FIG. 3 illustrates a sectional view taken along line III-III in FIG. 1, looking in the direction of arrows. Hereinafter, common XYZ coordinates are used for description throughout the drawings. Furthermore, XZ plane view is referred to as "plan view".

Also hereinafter, although the Y-axis positive direction may also be referred to as "up" and the Y-axis negative direction may also be referred to as "down" for convenience of description, these do not represent a universal up-down direction. Also for convenience of description, a position in the Y direction may also be represented in height. A most positive side in the Y-axis direction is a top portion and a most negative side in Y is a bottom portion.

The input device 100 includes a base portion 110, a seating 120, a motor 130, a worm gear 135, a gear 140, a rotor 150, a sliding member 160, coil springs 170, and a linear position sensor 180.

Figure 4:
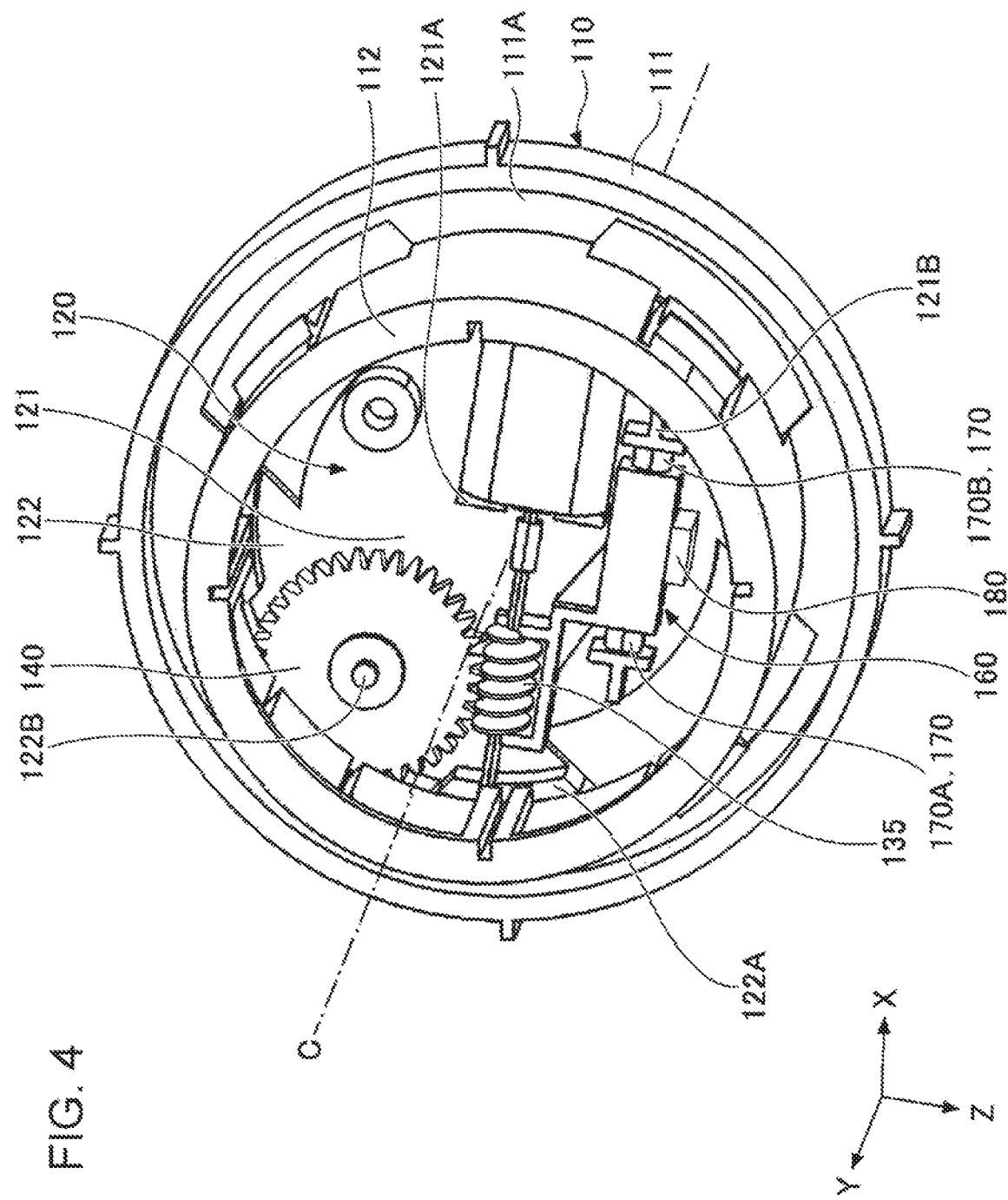
FIG. 4 illustrates a structure with a rotor removed from FIG. 1.
Figure 5:
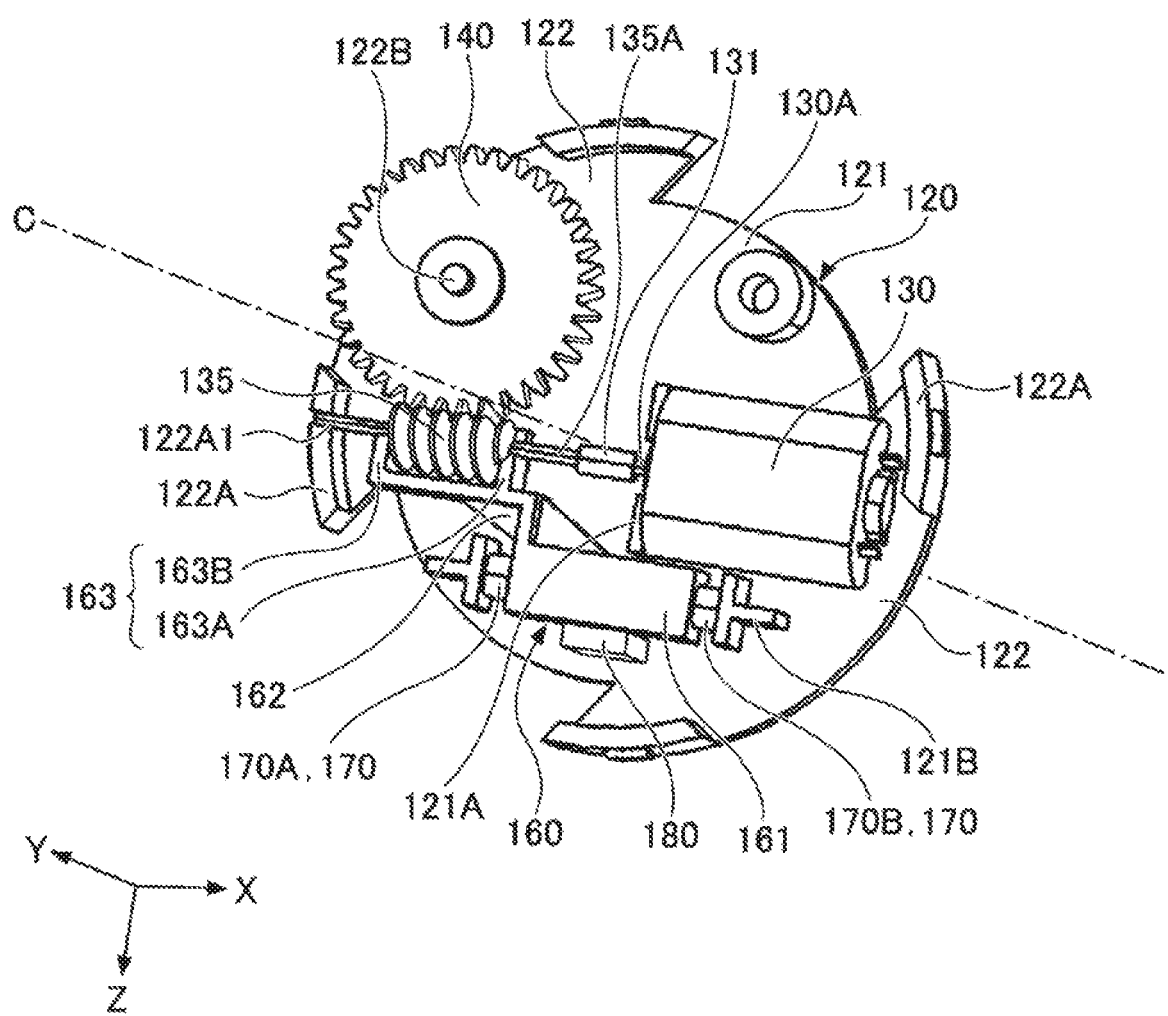
FIG. 5 illustrates the structure with a base portion removed from FIG. 4.

The following description will be made with reference to FIGS. 4 and 5 in addition to FIGS. 1 to 3. FIG. 4 illustrates a structure with the rotor 150 removed from FIG. 1. FIG. 5 illustrates the structure with the base portion 110 removed from FIG. 4.

In the following description, a central axis C (see FIG. 1) is common to the base portion 110, the seating 120, and the rotor 150. In plan view, these members have respective circular shapes, and the central axis C passes through the centers of these circular shapes. The central axis C is parallel to the Y axis.

For example, the input device 100 is mounted on a vehicle and used when remotely controlling operating portions and the like of graphic user interfaces (GUIs) displayed on operation screens of various devices such as a navigation device and an air conditioner displayed on display panels disposed around a dashboard. The input device 100 is disposed, for example, near the hands of the driver or an occupant in the passenger seat similarly to a center console of the vehicle. However, the form of use of the input device 100 is not limited to the form of use as described above.

The base portion 110 is a part at the base of the input device 100. The base portion 110 is an annular member a central axis of which is the central axis C in plan view. The base portion 110 has a cylindrical portion 111 provided on the outermost side in plan view and a cylindrical portion 112 provided inside the cylindrical portion 111 so as to be concentric with the cylindrical portion 111 in plan view. The cylindrical portions 111, 112 are cylindrical members center axes of which are the central axis C.

The cylindrical portion 112 is held by a connecting portions 111A that extend radially inward from a lower end (an end portion on the negative side in the Y-axis direction) of the cylindrical portion 111. The height of the cylindrical portion 112 is greater than the height of the cylindrical portion 111. Four connecting portions 111A are disposed so as to be equally spaced in a circumferential direction with gaps provided between the adjacent connecting portions 111A.

The base portion 110 supports the rotor 150 between the cylindrical portions 111 and 112 such that the rotor 150 is rotatable. Due to the cylindrical portions 111 and 112, the rotor 150 is rotated about the central axis C as a rotation central axis. Such a base portion 110 is formed of, for example, molded resin.

Preferably, the motor 130, the worm gear 135, the gear 140, the sliding member 160, the coil springs 170, and the linear position sensor 180 are provided inside the rotor 150 in plan view. The base portion 110 is provided around the seating 120 and supports the rotor 150 such that the rotor 150 is rotatable relative to the seating 120.

The seating 120 is provided inside the base portion 110 in plan view at an equal height to a bottom portion of the base portion 110 in the Y-axis direction. The seating 120 has a base plate portion 121 and extended portions 122. Such a seating 120 is formed of, for example, molded resin. The seating 120 is an example of a base member. The seating 120 may be integrally molded with adjacent parts disposed around the seating 120, for example, the base portion 110. The seating 120 itself may include a plurality of separate parts.

The base plate portion 121 is a circular plate-shaped member positioned at the center in plan view and has securing portions 121A, 121B. The motor 130 is secured to the securing portion 121A, and the coil springs 170 (170A, 170B) are secured to the securing portions 121B.

Two extended portions 122 are connected to the base plate portion 121. One of the extended portions 122 and memo) flatly extends in the X-axis positive direction and the Z-axis positive direction relative to the base plate portion 121. The other extended portion 122 flatly extends in the X-axis negative direction and the Z-axis negative direction relative to the base plate portion 121.

Each of the extended portions 122 has two projections 122A on the outermost side in plan view. The projections 122A project in the Y-axis positive direction. Accordingly, four projections 122A are provided. The projections 122A are engaged with an inner circumferential surface of the cylindrical portion 112 of the base portion 110. In this way, the seating 120 is attached to the base portion 110. Furthermore, one of two projections 122A of the other extended portion 122 positioned on the X axis has a bearing 122A1 (see FIG. 5) by which a rotation shaft 135A of the worm gear 135 is rotatably supported. The bearing 122A1 is positioned on the X axis.

Also, the other extended portion 122 has a shaft portion 122B that projects in the Y-axis positive direction. The gear 140 is rotatably supported by the shaft portion 122B.

The motor 130 is secured to the securing portion 121A provided on an upper surface (surface on the Y-axis positive side) of the base plate portion 121 of the seating 120. A drive shaft 130A (see FIGS. 2 and 5) of the motor 130 extends in the X axis direction. The rotation shaft 135A of the worm gear 135 is connected to the drive shaft 130A through a connecting portion 131. Part of an outer circumferential surface of the rotation shaft 135A is cut along the longitudinal direction to have a planar shape. Thus, the rotation shaft 135A has a substantially D-shaped sectional shape. The connecting portion 131 fixedly joins the drive shaft 130A and the rotation shaft 135A to each other. Preferably, the drive shaft 130A of the motor 130 is perpendicular to the central axis C.

The worm gear 135 has a helical shape along the X axis and has a through hole at a central portion. The through hole has a substantially D-shaped sectional shape similar to the sectional shape of the rotation shaft 135A so as to be slidably fitted onto the rotation shaft 135A. That is, the worm gear 135 is spline coupled to the rotation shaft 135A that extends in the X axis direction. Thus, the worm gear 135 is unitarily rotated with the rotation shaft 135A in the rotation direction and is slid on the rotation shaft 135A so as to be freely movable in the X axis direction. It is sufficient that the rotation shaft 135A and the worm gear 135 be splined coupled to each other and may have polygonal or double-D cut sectional shapes. The gear 140 is meshed (engaged) with the worm gear 135. Accordingly, regarding the worm gear 135, when a movement speed of the worm gear 135 rotated by the motor 130 in an advancing direction and a movement speed of an engagement portion of the gear 140, the movement being in the opposite direction to the advancing direction of the worm gear 135, rotated by rotation operation performed on the rotor 150 by an operator are completely equal to each other, the positions of the worm gear 135 and the gear 140 relative to each other are unchanged. That is, because of returning in the opposite direction caused by the gear 140 by the same distance as the distance by which the worm gear 135 advances in the advancing direction due to rotation, the worm gear 135 is rotated while remaining at an initial position on the rotation shaft 135A. In this case, the worm gear 135 does not cause any additional rotary torque to act on the rotation of the gear 140.

In contrast, when the movement speed of the worm gear 135 rotated by the motor 130 in the advancing direction and the movement speed of the engagement portion of the gear 140, the movement being in the opposite direction to the advancing direction of the worm gear 135, rotated by the rotation operation performed on the rotor 150 by the operator are different from each other, the worm gear 135 and the gear 140 are moved toward one of the worm gear 135 and the gear 140 moving at a higher speed than that of the other, and accordingly, the positions of the worm gear 135 and the gear 140 relative to each other change. For example, in the case where the worm gear 135 is rotated in a direction advancing in the X axis (axis direction of the drive shaft 130A) positive direction and the gear 140 is rotated in the X axis negative direction, when the worm gear 135 is rotated at a higher movement speed than that of the gear 140, the worm gear 135 is rotated while the position of the worm gear 135 is being moved in the X-axis positive direction along the rotation shaft 135A. Conversely, when the worm gear 135 is rotated at a lower advancing speed in the X-axis positive direction than a speed at which the gear 140 advances in the X-axis negative direction, the worm gear 135 is rotated while the position of the worm gear 135 is being moved in the X-axis negative direction along the rotation shaft 135A. Regarding the movement of the worm gear 135 along the rotation shaft 135A, the X-axis positive direction is an example of a first direction and the X-axis negative direction is an example of a second direction. When the worm gear 135 is moved in the X-axis, urging force of an elastic member, which will be described later, acts in a direction in which the worm gear 135 is returned to the initial position, and the urging force is added as rotary torque through the engagement portion to the gear 140 engaged with the worm gear 135. Although each of the rotation direction in which the motor is driven and the rotation direction of the operation by the operator is a single direction in the above-described example, this is not limiting. Each of the rotation directions can be arbitrarily selected to be either a forward direction or a reverse direction. In addition, any combination of the rotation directions can be selected.

The gear 140 is rotatably supported by the shaft portion 122B of the extended portion 122 of the seating 120. The gear 140 is an example of a first gear. As illustrated in FIG. 5, part of an outer circumferential portion of the gear 140 is positioned outside the other extended portion 122 in plan view between two projections 122A of the other extended portion 122. The gear 140 is meshed (engaged) with the worm gear 135 and a gear 152A of the rotor 150. Accordingly, the gear 140 is a helical gear that can be meshed with both the worm gear 135 and the gear 152A. The gear 140 holds a magnet (not illustrated) that is unitarily rotated with the gear 140. The magnet and a magnetic sensor (not illustrated, either) secured to the base plate portion 121 of the seating 120 are included in a rotation angle detection mechanism. For example, a rotation angle of the rotor 150 that is engaged with and unitarily rotated with the gear 140 may be calculated and detected as follows: a rotation angle of the gear 140 is detected by detecting a magnetic flux of the magnet that varies as the gear 140 is rotated, and the result of the detection is output to a controller, which will be described later.

The rotor 150 has cylindrical portions 151, 152. Central axes of the cylindrical portions 151, 152 are the central axis C. Such a rotor 150 is formed of, for example, molded resin. The diameter of the rotor 150 is about 50 mm. Preferably, the rotor 150 is a hollow rotor having a hollow inside the cylindrical portions 151, 152.

The rotor 150 is directly touched for operation by the operator of the input device 100. Thus, the rotor 150 is utilized as a knob. Although a form in which the operator directly touches the rotor 150 for operation is described herein, a cover-shaped member that covers the rotor 150 may be provided. In this case, the operator touches the cover-shaped member to indirectly operate the rotor 150.

The cylindrical portion 151 is positioned above (Y-axis positive side) the cylindrical portion 152 and has the outer diameter and the inner diameter that are greater than those of the cylindrical portion 152. The cylindrical portion 151 is connected to an upper side of the cylindrical portion 152. In the rotor 150, the cylindrical portion 151 is a part directly touched by the operator.

An outer circumference of the cylindrical portion 152 is greater than an inner circumference of the cylindrical portion 151 and smaller than an outer circumference of the cylindrical portion 151. The thickness of the cylindrical portion 152 and the thickness of the cylindrical portion 151 are substantially the same. A step is formed between the cylindrical portion 152 and the cylindrical portion 151 in sectional view.

The cylindrical portion 152 is fitted into a gap between the cylindrical portions 111, 112 and rotatably supported relative to the base portion 110. When the cylindrical portion 152 is fitted into the gap between the cylindrical portions 111, 112, an engagement portion 112A provided on an outer circumferential surface of the cylindrical portion 112 is engaged with the step between the cylindrical portions 152, 151. Thus, the rotor 150 is fitted into the base portion 110.

Preferably, the gear 152A is formed at a lower end of an inner circumferential surface of the cylindrical portion 152 in the circumferential direction (rotation direction). The gear 152A is provided throughout an inner circumference of the cylindrical portion 152. The gear 152A is an example of a second gear.

The gear 152A appears between four projections 122A when seen from the inside of the cylindrical portion 112 of the base portion 110. The gear 152A is a helical gear meshed (engaged) with the helical gear 140. Accordingly, when the operator applies force so as to rotate the rotor 150, rotation force is transmitted from the gear 152A to the gear 140, and further, movement force in the X-axis direction is transmitted to the worm gear 135.

The sliding member 160 has a base portion 161, a stay portion 162, and a holding portion 163 (see FIG. 5). Such a sliding member 160 is formed of, for example, molded resin. The sliding member 160 is an example of a movement member.

The base portion 161 is attached to the securing portions 121B of the seating 120 at both ends by using the coil springs 170A, 170B. The base portion 161 is movable in the X-axis direction due to extension and contraction of the coil springs 170A, 170B in the X-axis direction.

The stay portion 162 is integrally molded with the base portion 161 and extends from the base portion 161 toward the worm gear 135. When seen from the base portion 161, the holding portion 163 is provided at a distal end of the stay portion 162.

The holding portion 163 is divided from the distal end of the stay portion 162 into two parts, that is, projections 163A, 163B and holds the rotation shaft 135A at both ends of the worm gear 135 such that the rotation shaft 135A is rotatable. The projections 163A, 163B are respectively provided on the X-axis positive side and the X-axis negative side of the worm gear 135. A space between the projections 163A, 163B is made to match the length of the worm gear 135 in the X-axis direction such that the worm gear 135 is rotatably fitted between the projections 163A, 163B. In other words, the space between the projections 163A, 163B is set so as not to allow displacement, in the X-axis direction, of the worm gear 135 interposed between the projections 163A, 163B.

Figure 6:
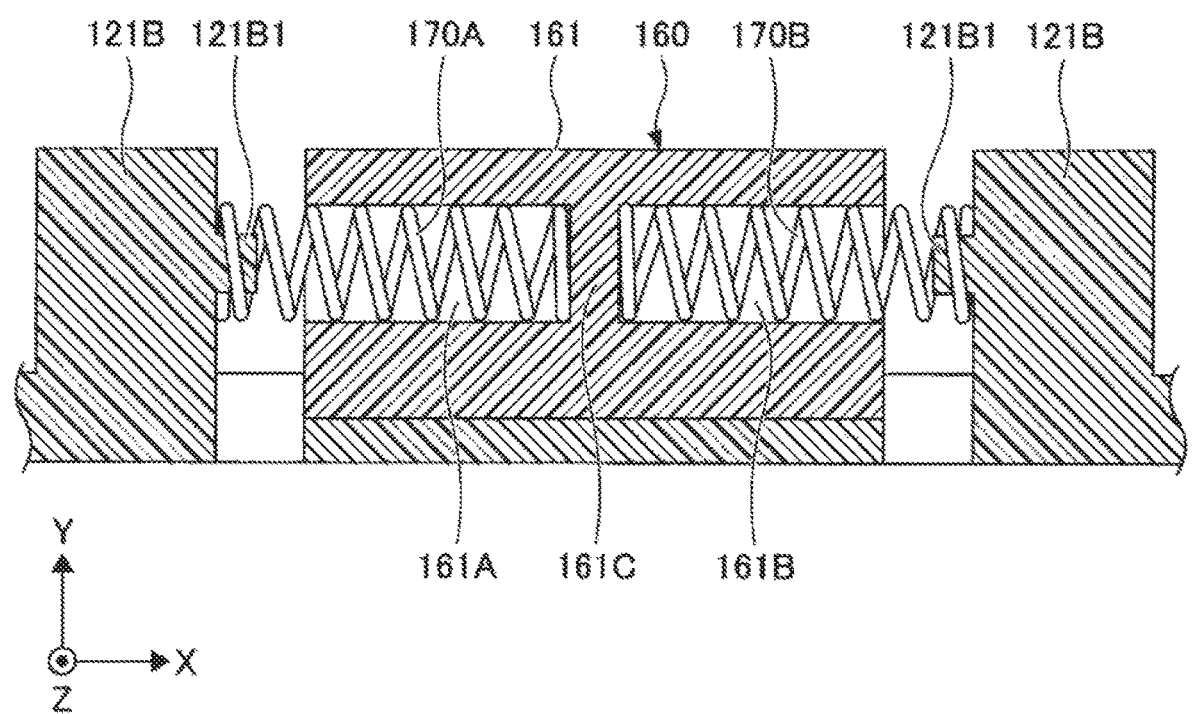
FIG. 6 illustrates a section parallel to the XY plane including coil springs, a base portion, and securing portions.

The coil springs 170 have a pair of the coil springs 170A, 170B. Herein, description is made with reference to FIG. 6 in addition to FIGS. 1 to 5. FIG. 6 illustrates a section parallel to the XY plane including the coil springs 170A, 170B, the base portion 161, and the securing portions 121B. Each of the coil springs 170 is an example of the elastic member.

The base portion 161 has a holes 161A, 161B. The hole 161A is formed from a side surface of the base portion 161 on the X-axis positive side toward the X-axis negative side. The hole 161B is formed from a side surface of the base portion 161 on the X-axis negative side toward the X-axis positive side. A wall portion 161C is disposed between the holes 161A, 161B, thereby the holes 161A, 161B are separated from each other. Furthermore, the securing portions 121B have respective projections 121B1.

The coil springs 170A, 170B are compression coil springs. The coil spring 170A is inserted into the hole 161A at an end portion on the X-axis negative side and engaged with the projection 121B1 of the securing portion 121B on the X-axis positive side at and end portion on the X-axis positive side. The coil spring 170A is provided between the wall portion 161C and the projection 121B1 of the securing portion 121B on the X-axis positive side in a state in which the coil spring 170A is compressed from the natural length.

Likewise, the coil spring 170B is inserted into the hole 161B at an end portion on the X-axis positive side and engaged with the projection 121B1 of the securing portion 121B on the X-axis negative side at and end portion on the X-axis negative side. The coil spring 170B is provided between the wall portion 161C and the projection 121B1 of the securing portion 121B on the X-axis negative side in a state in which the coil spring 170B is compressed from the natural length.

The linear position sensor 180 is secured to the base plate portion 121 of the seating 120 and detects displacement of the base portion 161 of the sliding member 160 from an initial state in the X-axis direction. When the coil spring 170A and the coil spring 170B that urge the base portion 161 are kept in balance, the base portion 161 assumes the initial state. Data indicative of the displacement detected by the linear position sensor 180 is output to the controller, which will be described later. The linear position sensor 180 is an example of a change amount detection unit, and the displacement of the base portion 161 in the X-axis direction is an example of a change amount.

In the input device 100 having the structure as described above, when the operator applies force so as to rotate the rotor 150, the rotation force is transmitted from the gear 152A to the gear 140, and further, the movement force in the X-axis direction is transmitted to the worm gear 135.

The worm gear 135 is not rotated even when the rotation force is added from the gear 140 side due to a so-called self-locking effect of a worm on a worm wheel. However, since the worm gear 135 and the rotation shaft 135A are spline coupled, when the operator applies force so as to rotate the rotor 150, the worm gear 135 is moved by the gear 140 in the X-axis positive direction or X-axis negative direction along the rotation shaft 135A. At the same time, when the worm gear 135 is rotated by the motor 130, the worm gear 135 is moved in the X-axis positive direction or the X-axis negative direction depending on its own rotation direction. Accordingly, regarding a movement amount of the worm gear 135, when the movement in the X-axis positive direction is defined as a positive movement amount and the movement in the X-axis negative direction is defined as a negative movement amount, a final movement amount of the worm gear 135 on the X axis is the sum of the movement amount by the gear 140 and the movement amount by its own rotation.

As the worm gear 135 is moved in the X-axis positive direction or the X-axis negative direction, the sliding member 160 is slid in the X-axis positive direction or the X-axis negative direction. Thus, restoring force in a direction in which the base portion 161 is returned to an initial position, that is, in the X-axis negative direction or the X-axis positive direction acts on the base portion 161 due to contraction of one coil spring out of the coil springs 170A, 170B disposed on one side toward which the base portion 161 is moved and extension of the other coil spring on the opposite side. Also at this time, the linear position sensor 180 detects the movement amount of the sliding member 160, thereby drive of the motor 130 is controlled. The restoring force is an example of the urging force.

Accordingly, when the operator applies force to rotate the rotor 150, force based on the restoring force of the coil springs 170A, 170B in accordance with the movement amount of the base portion 161 from the initial state acts on the hand of the operator who performs the rotation operation on the rotor 150 as the rotary torque added to the rotor 150 through the sliding member 160, the worm gear 135, the gear 140, and the gear 152A. Thus, a sense of force is provided.

At this time, the controller drives the motor 130 in a direction in which the restoring force of the coil springs 170A, 170B is assisted, that is, the movement amount of the sliding member 160 is reduced or in a direction in which the restoring force is limited, that is, the movement amount of the sliding member 160 is increased. Thus, to the hand of the operator who operates the rotor 150, various senses of force are provided by varying, for example, the magnitude, direction, or timing of the rotary torque to be added.

Figure 7:
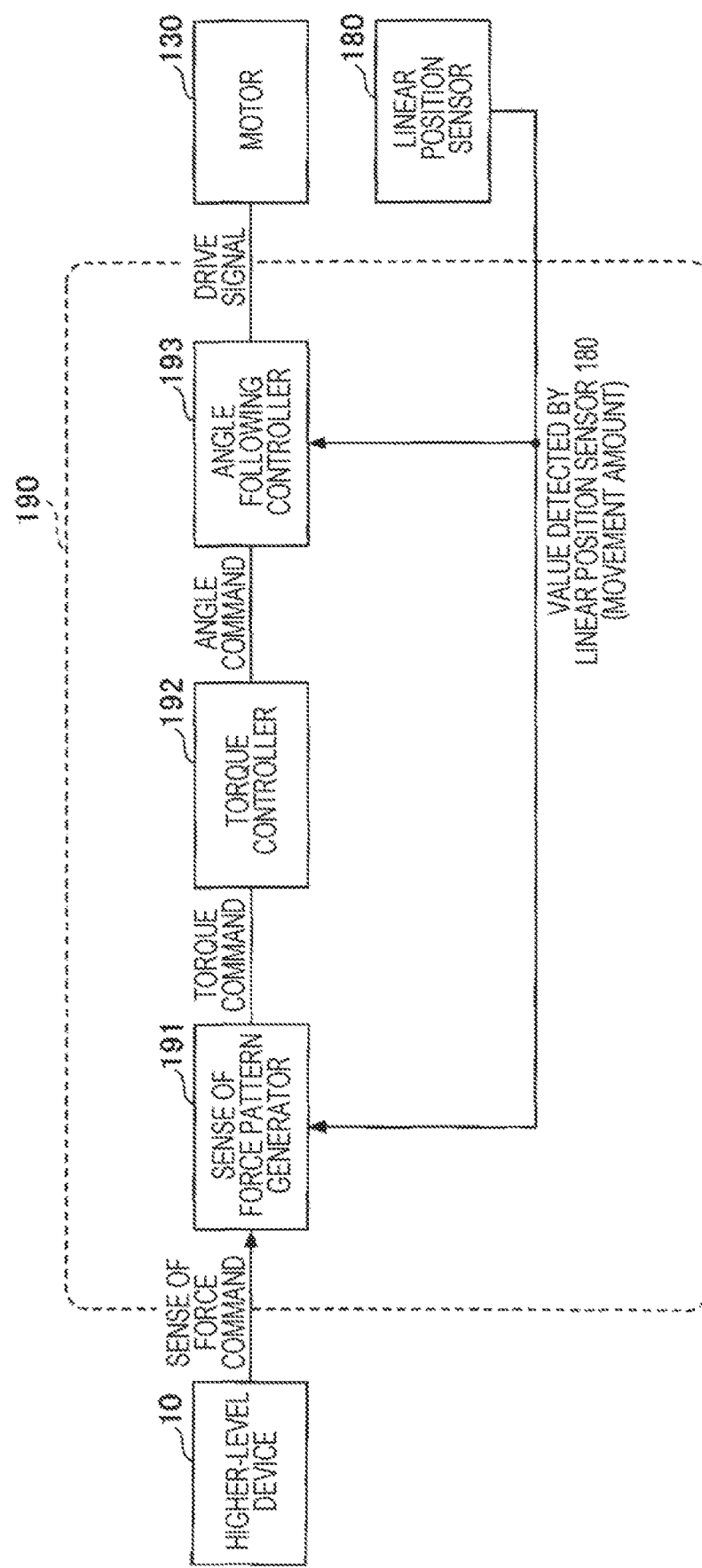
FIG. 7 illustrates a control system of the input device.

FIG. 7 illustrates a control system of the input device 100. In FIG. 7, a higher-level device 10 is illustrated in addition to a controller 190, the motor 130, and the linear position sensor 180 of the input device 100.

Although the structure between the motor 130 and the linear position sensor 180 (the worm gear 135, the gear 140, and the rotor 150) is omitted from FIG. 7, when the operator applies force that rotates the rotor 150, the rotation of the rotor 150 is detected by the rotation angle detection mechanism (not illustrated), thereby the drive of the motor 130 is started. Furthermore, when the motor 130 is rotated, the sliding member 160 is slid due to the movement of the worm gear 135, and the movement amount of the sliding member 160 is detected by the linear position sensor 180.

The higher-level device 10 is, for example, an electronic control unit (ECU) of any of various devices mounted on a vehicle such as a navigation device and an air conditioner. The higher-level device 10 is realized by a computer that includes a central processing unit (CPU), a random-access memory (RAM), a read-only memory (ROM), a hard disk drive (HDD), an input/output interface, an internal bus, and so forth.

The higher-level device 10 stores in memory data indicative of sense of force commands corresponding to the senses of force provided when the input device 100 is operated in accordance with input modes of the input device 100 and outputs a sense of force command corresponding to a selected input mode to the controller 190. The input mode is, for example, a mode for operation of one of the navigation device, air conditioner, and the like. In accordance with the input mode, display content of the display provided in the dashboard is switched to that of the navigation device, the air conditioner, or the like. Due to the sense of force commands corresponding to the input modes, the sense of force such as, for example, a strong clicking sensation and a weak clicking sensation or continuous predetermined rotation load torque are provided.

The controller 190 includes a sense of force pattern generator 191, a torque controller 192, and an angle following controller 193.

The sense of force pattern generator 191 generates a torque command based on the movement amount detected by the linear position sensor 180, the sense of force command input from the higher-level device 10, and an angle of the rotor 150 detected by the rotation angle detection mechanism. The sense of force pattern generator 191 outputs the generated torque command to the torque controller 192.

When the sense of force pattern generator 191 converts the sense of force command into the torque command for the predetermined angle of the rotor 150, a force-stroke (FS) characteristic of a predetermined elastic member is utilized for the conversion. The sense of force pattern generator 191 converts torque for the predetermined angle of the rotor 150 corresponding to the type of the sense of force command into a stroke of the elastic member. The converted stroke is converted into the movement amount to be detected by the linear position sensor 180, thereby the torque command is generated.

The torque controller 192 performs a conversion process to convert into a rotation angle of the drive shaft 130A of the motor 130 the rotation amount of the worm gear 135 becoming the movement amount of the base portion 161 from the initial position indicated by the torque command input from the sense of force pattern generator 191, thereby generating an angle command. The torque controller 192 outputs the angle command to the angle following controller 193. The torque controller 192 generates the angle command in the direction in which the restoring force of the coil springs 170A, 170B is assisted or in the direction in which the base portion 161 is moved so as to limit the restoring force.

The angle following controller 193 obtains a current rotation angle of the rotation shaft 135A, that is, the drive shaft 130A of the motor 130 from a current movement amount detected by the linear position sensor 180. The angle following controller 193 performs feedback control based on a target rotation angle in accordance with the angle command input from the torque controller 192 and the current rotation angle, thereby generating a drive signal for performing drive control for the motor 130. The drive signal is, for example, a pulse width modulation (PWM) signal, and the angle following controller 193 determines a duty ratio by performing the feedback control.

For example, when the sense of force command from the air conditioner is a request for a sense of force pattern with a strong clicking sensation repeated a plurality of times in the rotation operation for selecting an air volume, the torque command input from the sense of force pattern generator 191 is required to repeatedly change rotation torque in the opposite direction to the operation direction added during the rotation operation (simply referred to as "added torque" hereinafter) between large rotation torque and small rotation torque. Accordingly, the coil springs 170A, 170B for generating the added torque is also required to repeatedly change the contraction amount between a large contraction amount (added torque is large) and a small contraction amount (added torque is small). Thus, the torque controller 192 generates the angle command for the drive shaft 130A of the motor 130 so that the movement amount of the base portion 161 detected by the linear position sensor 180 repeatedly changes between a large movement amount (the contraction amount of the coil springs 170 is large) and a small movement amount (the contraction amount of the coil springs 170 is small). That is, the angle command for the direction in which the restoring force of the coil springs 170 is assisted (the contraction amount of the coil springs 170 is reduced) or the direction in which the restoring force of the coil springs 170 is limited (the contraction amount of the coil springs 170 is increased) is generated and output to the angle following controller 193. After that, the feedback control of the motor 130 is performed based on the target rotation angle of the drive shaft 130A in accordance with the angle command input from the torque controller 192 and the current rotation angle of the drive shaft 130A obtained from the current movement amount of the base portion 161 detected by the linear position sensor 180 so as to control the rotation torque added to the predetermined angle of the rotor 150 to obtain a desired sense of force.

In the input device 100 according to the present embodiment, it is set that, when the rotation operation performed on the rotor 150 by the operator and the drive control for the motor 130 as described above end, the worm gear 135 and the base portion 161 are usually returned to the initial state due to the restoring force of the coil springs 170. Accordingly, when the above-described control is performed on the input device 100, the control can be usually performed from the initial state.

Other senses of force pattern can be controlled by a method similar to the above-described method.

As described above, the input device 100 includes the gear 140, the worm gear 135, and the coil springs 170. The gear 140 and the worm gear 135 are rotated as the rotor 150 is rotated. The coil springs 170 generate the restoring force that suppresses sliding of the sliding member 160 which is moved as the worm gear 135 is moved. In addition, the input device 100 includes the motor 130 that drives the worm gear 135 in the direction in which the restoring force is assisted or limited.

When the rotor 150 undergoes the rotation operation, the added rotation torque is generated in accordance with the movement amount of the worm gear 135 in the rotor 150 through the gear 140 in the direction in which the restoring force of the coil springs 170A, 170B is assisted or by limiting the restoring force.

The sense of force provided to the hand of the operator by the input device 100 having the structure as described above is realized by the restoring force of the coil springs 170A, 170B. The motor 130 is provided to drive the worm gear 135 for assisting or limiting the restoring force. Thus, compared to the case of, for example, the related-art device in which the motor is directly connected and the sense of force is realized only by torque of the motor itself, the drive torque of the motor 130 can be significantly reduced.

Furthermore, since the rotation control is performed by using the linear position sensor provided at a location other than that in the motor, the motor itself is not required to have a highly accurate rotation angle detection mechanism or the like. This can drop the need of providing in the motor the structure that would otherwise be necessary for the torque control of the motor. Accordingly, the structure of the motor can be simplified. Thus, the input device 100 can provide the sense of force with the structure that uses the motor 130 the torque of which is lower and the structure of which is simpler and smaller than those of the related-art device.

Thus, according to the embodiment, the size-reduced input device 100 can be provided.

Furthermore, since the worm gear 135 is used, when the self-locking effect of the worm gear 135 by which the worm gear 135 cannot be rotated from the worm wheel side is utilized, the torque of the motor 130 is reduced in the case where the motor 130 generates the torque that limits or holds the restoring force. Also from such a viewpoint, the size of the motor 130 can be reduced, and the size of the input device 100 can be reduced.

The worm gear 135 is connected to the gear 152A of the rotor 150 via the gear 140. Thus, a large reduction ratio can be obtained when seen from the worm gear 135 side. Accordingly, even when the added rotation torque generated in the worm gear 135 for the gear 140 is small, the added rotation torque is amplified for the rotor 150, and, a sufficient sense of force can be provided. Also from such a viewpoint, the size of the motor 130 can be reduced, and the size of the input device 100 can be reduced. Furthermore, the motor 130, the worm gear 135, the gear 140, the sliding member 160, the coil springs 170, and the linear position sensor 180 are disposed in a space surrounded by the rotor 150 and the seating 120. Accordingly, both improvement of space efficiency and size reduction can be achieved by the size reduction of the motor 130.

Furthermore, two coil springs 170A, 170B are used to urge the sliding member 160. Thus, regardless of whichever direction the rotor 150 is moved in, the restoring force due to extension/contraction of one of coil springs (170A or 170B) and the restoring force due to contraction of the other coil spring (170A or 170B) can be obtained. This provides a structure in which a uniform sense of force is easily provided regardless of the rotation direction.

Furthermore, various senses of force can be realized by changing the rotation torque added by the drive of the motor 130 in a time-series manner in accordance with the rotation angle of the rotor 150. For example, when drive patterns of the motor 130 are provided so as to vary the sense of force in accordance with types of various devices such as the navigation device, air conditioner, and the like or types of operation content, the operator can check the operation content or perceive the completion of operation only by the sense of force.

Although the form in which the motor 130 and the rotation shaft 135A are perpendicular to the central axis C has been described above, the motor 130 or the rotation shaft 135A is not necessarily perpendicular to the central axis C.

Furthermore, although the form in which the input device 100 includes the worm gear 135, the gear 140, and the gear 152A has been described above, the structure of the gears or teeth is not limited to the above-described structure and may have another structure.

Furthermore, although the form in which compression coil springs are used as the coil springs 170A, 170B has been described above, the coil springs 170A, 170B may be varied as illustrated in FIGS. 8 to 12. In FIGS. 8 to 12, the base portion of the sliding member, the coil springs, and the securing portions according to variations of the embodiment are illustrated.

Figure 8:
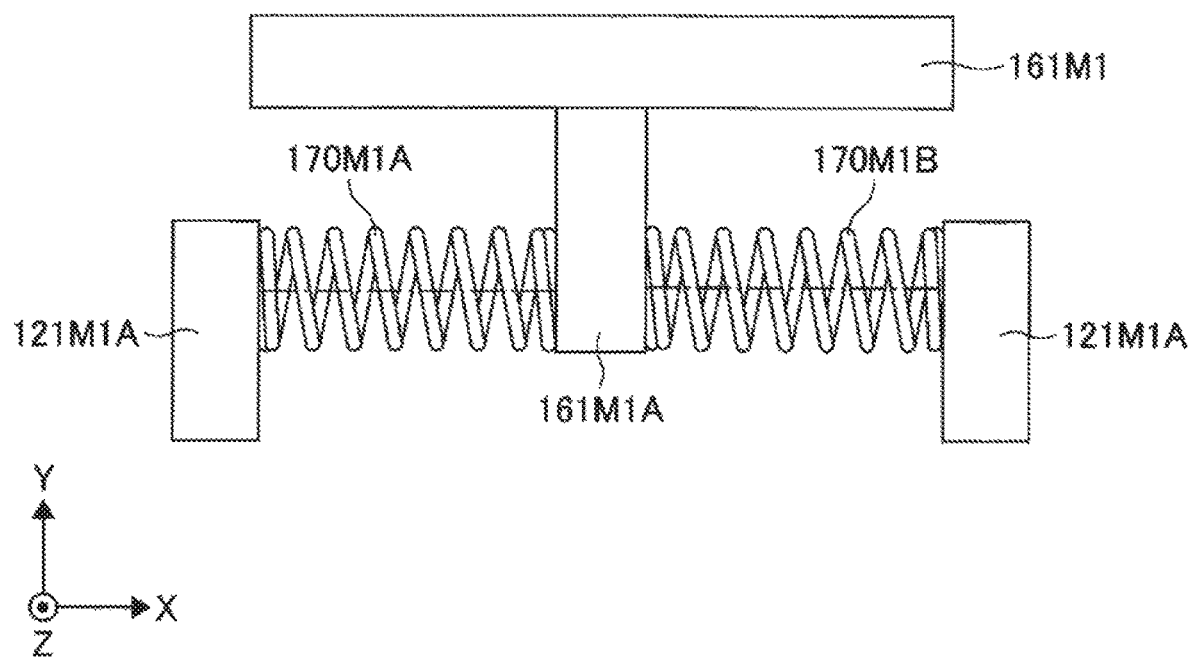
FIG. 8 illustrates a base portion of a sliding member, coil springs, and securing portions according to a variation of the embodiment.

As illustrated in FIG. 8, a base portion 161M1 having a T shape in side view, tension-type coil springs 170M1A, 170M1B extended longer than the natural length, and securing portions 121M1A may be used. The base portion 161M1 has a projection 161M1A projecting downward.

The tension-type coil springs 170M1A, 170M1B are secured between both side surfaces of the projection 161M1A and the securing portions 121M1A on both sides. Each of the tension-type coil springs 170M1A, 170M1B is secured to the surfaces facing each other at both ends by using securing hook shapes (not illustrated) in a state in which the tension-type coil springs 170M1A, 170M1B are extended longer than the natural length. When the rotor 150 is rotated, the projection 161M1A is moved in the X-axis positive direction or the X-axis negative direction. Thus, one of the coil springs 170M1A, 170M1B extends/contracts and the other of the coil springs 170M1A, 170M1B extends, thereby the restoring force is generated compared to a balanced state illustrated in FIG. 8.

When the base portion 161M1 and the securing portions 121M1A as described above are used, the sense of force can be provided in accordance with the rotation of the rotor 150 by utilizing the restoring force of the coil springs 170M1A, 170M1B extended longer than the natural length.

Figure 9:
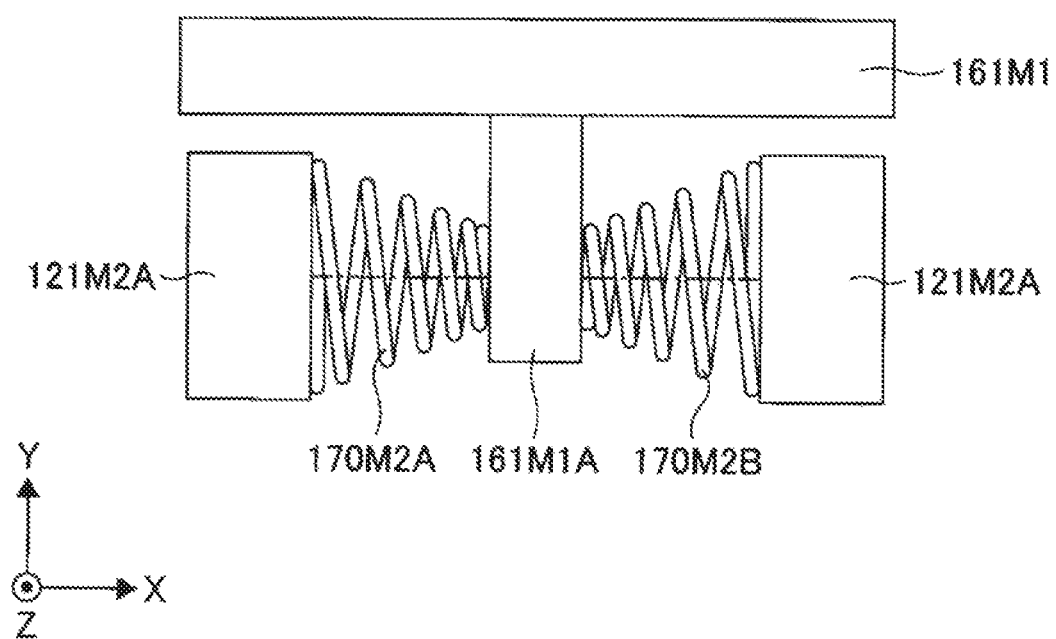
FIG. 9 illustrates a base portion of the sliding member, coil springs, and securing portions according to a variation of the embodiment.

Alternatively, as illustrated in FIG. 9, conical springs 170M2A, 170M2B, the base portion 161M1, and the securing portions 121M1A may be used. Both ends of each of the conical springs 170M2A, 170M2B are secured between a corresponding one of the side surfaces of the projection 161M1A and the securing portion 121M1A on a corresponding one of both sides. The conical springs 170M2A, 170M2B may be compression-type conical springs or tension-type springs extended longer than the natural length. The conical springs 170M2A, 170M2B operate similarly to those illustrated in FIGS. 1 to 6 and 8.

Figure 10:
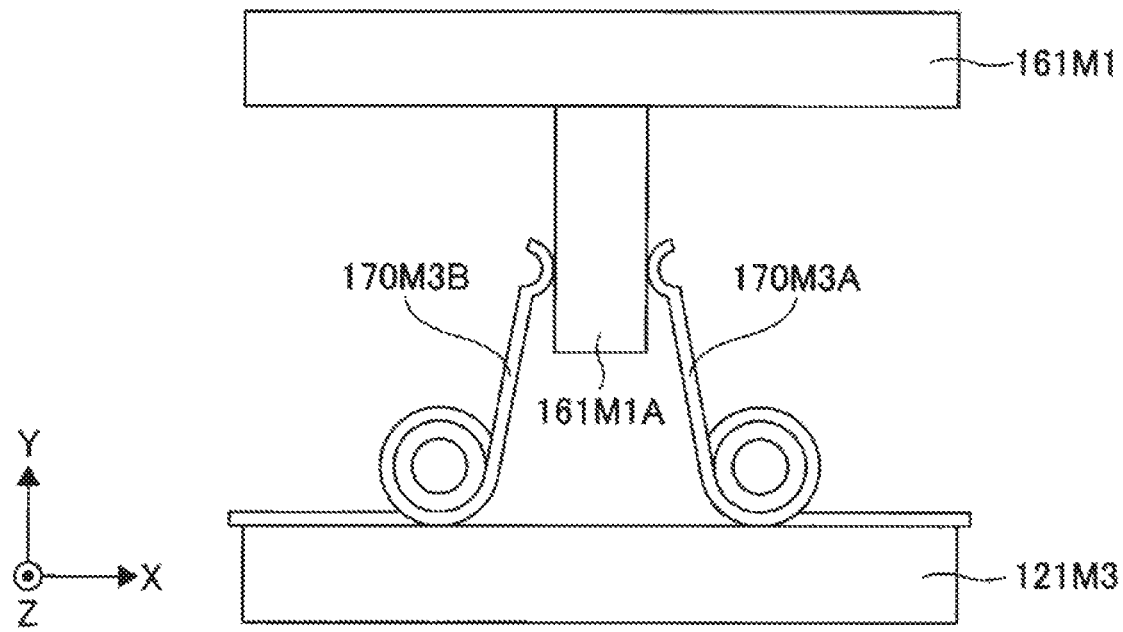
FIG. 10 illustrates a base portion of the sliding member, torsion springs, and a base plate portion according to a variation of the embodiment.

Alternatively, as illustrated in FIG. 10, two torsion springs 170M3A, 170M3B, the base portion 161M1, and a base plate portion 121M3 may be used. Each of the torsion springs 170M3A, 170M3B is in contact with the surface of the base plate portion 121M3 at one end and engaged with the projection 161M1A of the base portion 161M1 at the other end. Both ends of each of the torsion springs 170M3A, 170M3B are disposed closer to each other in this state than in the natural state, and the restoring force is generated in an opening direction.

When the rotor 150 is rotated, the projection 161M1A is moved in the X-axis positive direction or the X-axis negative direction. Thus, one of the torsion springs 170M3A, 170M3B is compressed and the other of the torsion springs 170M3A, 170M3B is opened.

When the base portion 161M1 and the base plate portion 121M3 as described above are used, the sense of force can be provided in accordance with the rotation of the rotor 150 by utilizing the restoring force of the torsion springs 170M3A, 170M3B.

Figure 11:
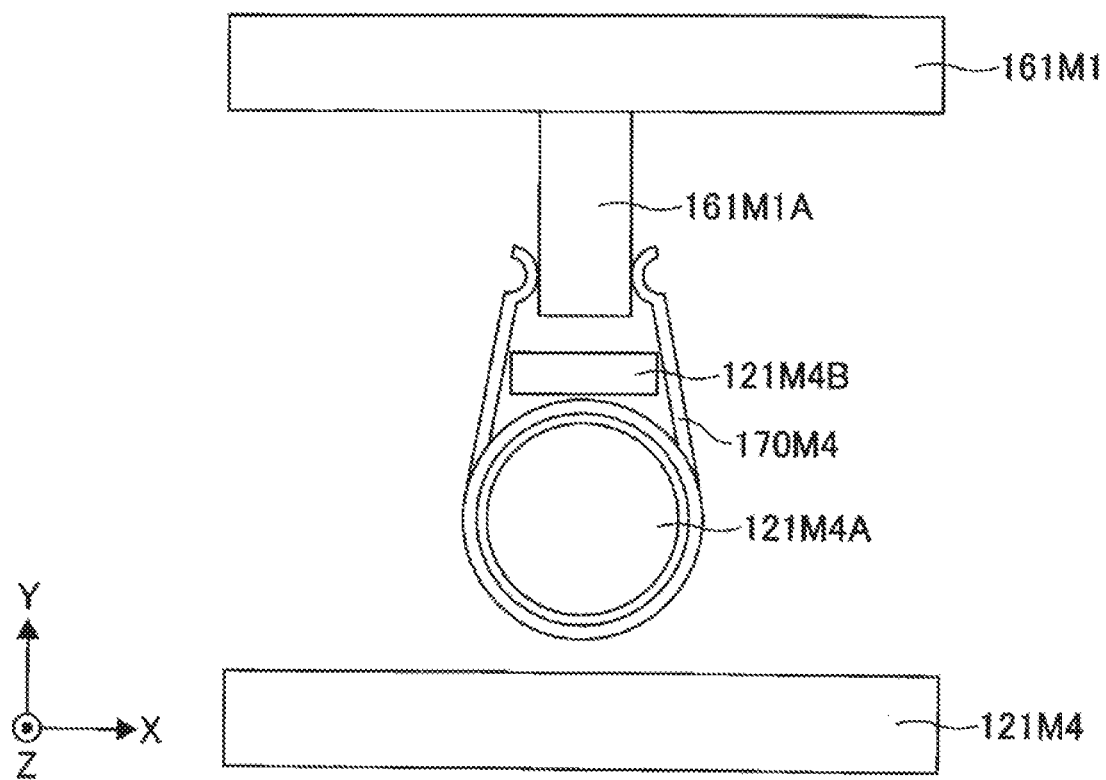
FIG. 11 illustrates a base portion of the sliding member, a torsion spring, and a base plate portion according to a variation of the embodiment.

Alternatively, as illustrated in FIG. 11, a single torsion spring 170M4, the base portion 161M1, and a base plate portion 121M4 may be used. The base plate portion 121M4 has a cylindrical holding portion 121M4A extending in the Z-axis direction and a plate-shaped stopper 121M4B positioned above the holding portion 121M4A. The holding portion 121M4A and the stopper 121M4B are secured at the respective heights illustrated in FIG. 11 by using stays or the like (not illustrated) above an upper surface of the base plate portion 121M4.

The torsion spring 170M4 is in contact with both the side surfaces of the projection 161M1A of the base portion 161M1 at both ends while a winding portion of the torsion spring 170M4 is wound around the holding portion 121M4A and portions of the torsion spring 170M4 near the respective ends are in contact with the stopper 121M4B. The torsion spring 170M4 is opened more in this state at both the ends than in the natural state, and the restoring force is generated in a closing (both the ends approach each other) direction.

When the rotor 150 is rotated, the projection 161M1A is moved in the X-axis positive direction or the X-axis negative direction. Thus, the one of both the ends of the torsion spring 170M4 is opened, and the restoring force is generated.

When the base portion 161M1 and the base plate portion 121M4 as described above are used, the sense of force can be provided in accordance with the rotation of the rotor 150 by utilizing the restoring force of the torsion spring 170M4.

Figure 12:
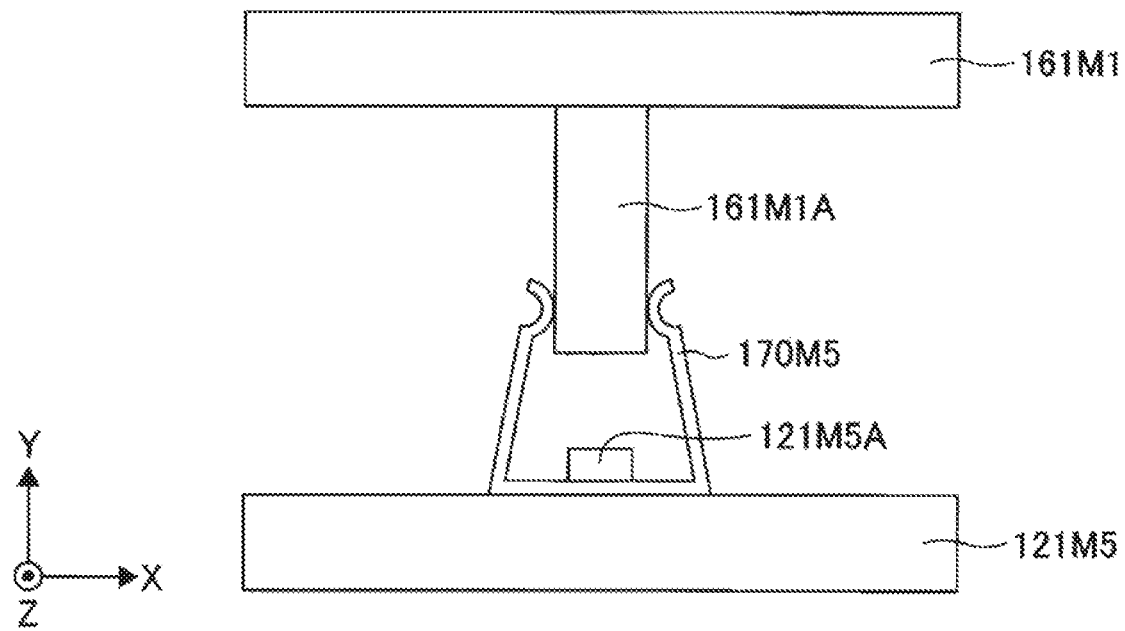
FIG. 12 illustrates a base portion of the sliding member, a plate spring, and a base plate portion according to a variation of the embodiment.

Alternatively, as illustrated in FIG. 12, a single plate spring 170M5, the base portion 161M1, and a base plate portion 121M5 may be used. The base plate portion 121M5 has a protrusion 121M5A at an upper surface. The plate spring 170M5 is bent into a triangular shape in side view and has an opening in a bottom portion thereof through which the protrusion 121M5A is inserted in plan view. The plate spring 170M5 is secured to the upper surface of the base plate portion 121M5 by inserting the protrusion 121M5A through the opening of the bottom portion of the plate spring 170M5.

The plate spring 170M5 is opened more in this state at both the ends than in the natural state, and the restoring force is generated in a closing (both the ends approach each other) direction.

When the rotor 150 is rotated, the projection 161M1A is moved in the X-axis positive direction or the X-axis negative direction. Thus, the one of both the ends of the plate spring 170M5 is opened, and the restoring force is generated.

When the base portion 161M1 and the base plate portion 121M5 as described above are used, the sense of force can be provided in accordance with the rotation of the rotor 150 by utilizing the restoring force of the plate spring 170M5.

Figure 13:
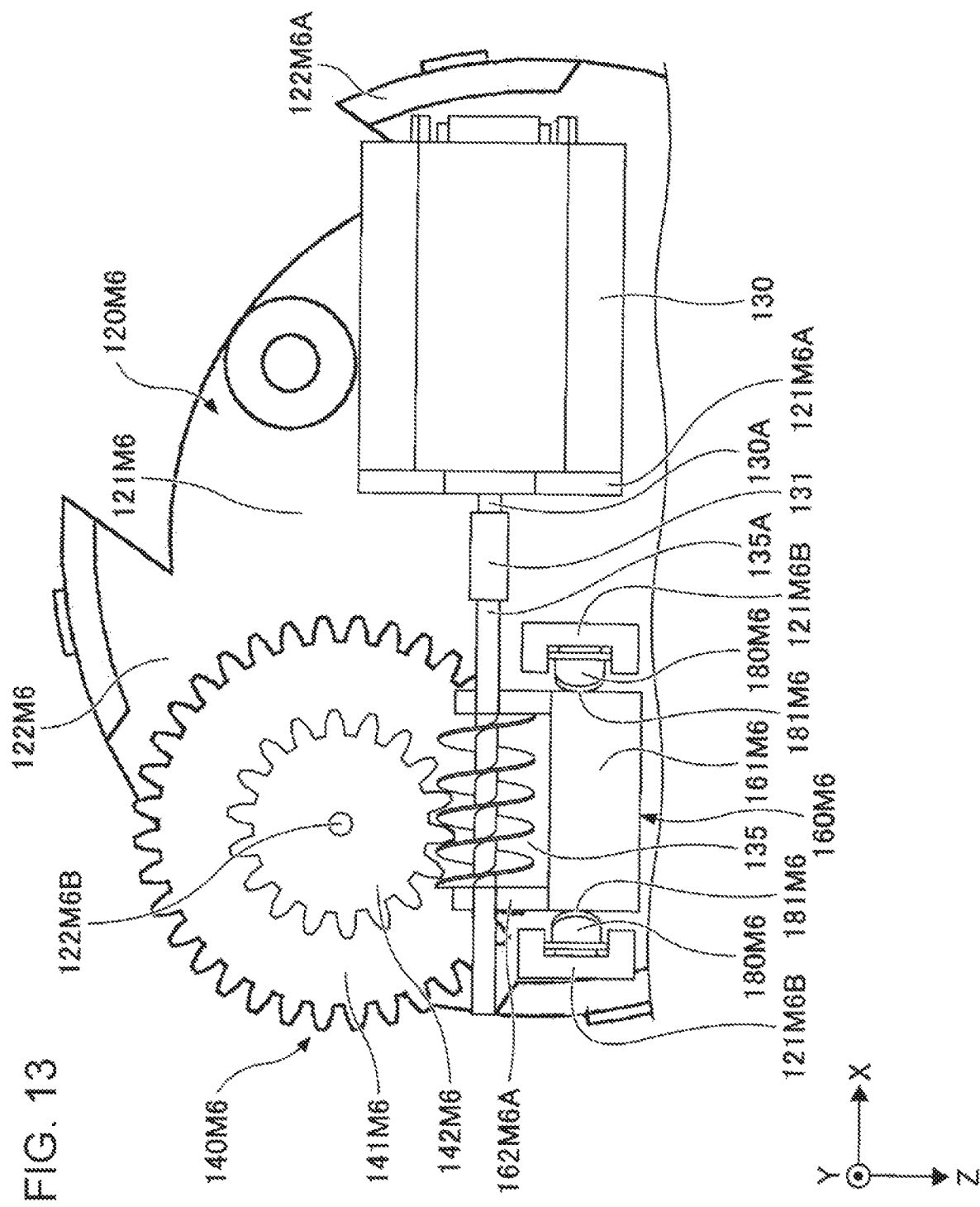
FIG. 13 illustrates a variation according to the embodiment.

FIG. 13 illustrates a variation according to the embodiment. Referring to FIG. 13, a seating 120M6 is included instead of the seating 120 illustrated in FIGS. 1 to 5, a gear 140M6 is included instead of the gear 140 illustrated in FIGS. 1 to 5, a sliding member 160M6 is included instead of the sliding member 160 illustrated in FIGS. 1 to 5, and pressure sensors 180M6 are included instead of the coil springs 170A, 170B and the linear position sensor 180 illustrated in FIGS. 1 to 5. In FIG. 13, the seating 120M6, the motor 130, the worm gear 135, the gear 140M6, the sliding member 160M6, the pressure sensors 180M6, and rubber members 181M6 are illustrated, and other elements are omitted.

The seating 120M6 has a base plate portion 121M6 and extended portions 122M6. The base plate portion 121M6 has securing portions 121M6A, 121M6B. The motor 130 is secured to the securing portion 121M6A. The sliding member 160M6 is attached to the securing portions 121M6B with two pressure sensors 180M6 and two rubber members 181M6 interposed therebetween. The extended portions 122M6 have projections 122M6A and a shaft portion 122M6B. The projections 122M6A are similar to the projections 122A (see FIG. 5). The gear 140M6 is rotatably supported by the shaft portion 122M6B.

The gear 140M6 has a gear 141M6 and a gear 142M6. The gear 141M6 is a spur gear corresponding to the gear 140 illustrated in FIGS. 1 to 5. The gear 142M6 is a spur gear provided such that the gear 142M6 is secured to the gear 141M6 so as to be coaxial with the gear 141M6 and has a smaller diameter than that of the gear 141M6. The gear 141M6 is engaged with the gear 152A of the rotor 150. The gear 142M6 is engaged with the worm gear 135.

The sliding member 160M6 has a base portion 161M6 and projections 162M6A, 162M6B. The base portion 161M6 is a box-shaped member and attached to the securing portions 121M6B with the pressure sensors 180M6, one at each side of the base portion 161M6 in the X-axis direction, and the rubber members 181M6, one at each side of the base portion 161M6 in the X-axis direction, interposed therebetween. The projections 162M6A, 162M6B extending in the Z-axis negative direction are provided at the respective ends of the base portion 161M6 in the X-axis direction. As is the case with the projections 163A, 163B illustrated in FIG. 5, the projections 162M6A, 162M6B hold the rotation shaft 135A at both the ends of the worm gear 135 such that the rotation shaft 135A is rotatable.

The pressure sensors 180M6 detect pressure (stress or load). Two pressure sensors 180M6 secured to the securing portions 121M6A, 121M6B hold the base portion 161M6 of the sliding member 160M6 with two rubber members 181M6 interposed therebetween. The rubber members 181M6 are deformable in the X-axis direction when a load is applied to the base portion 161M6 in the X-axis direction. At this time, the pressure sensors 180M6 detect the pressure. As such pressure sensors 180M6, for example, sensors commercially available as force sensors may be used. The rubber members 181M6 are not necessarily formed of rubber as long as the rubber members 181M6 are elastic and deformable, for example, by about 0.3 mm in the X-axis direction. For example, the rubber members 181M6 may be formed of elastomer resin.

When the rotor 150 is rotated and the motor 130 is driven, the sliding member 160M6 is moved in the X-axis positive direction or the X-axis negative direction. This causes one of the two rubber members 181M6 to be pressurized, thereby the restoring force is generated. Also, at this time, the pressure sensors 180M6 detect pressurizing force.

When the motor 130 is driven in accordance with the pressurizing force detected by the pressure sensors 180M6, the restoring force is transmitted from the worm gear 135 to the gear 152A via the gear 140M6, and the sense of force can be provided in accordance with the rotation of the rotor 150.

For example, in such a case where addressing of operation at smaller torque than the spring constant of the coil springs 170A, 170B is desired, the pressure sensors 180M6 may be utilized.

Although the input device according to the exemplary embodiment of the present invention has been described above, the present invention is not limited to the specifically disclosed embodiment and can be varied or modified in various manners without departing from the scope of the claims.

What is claimed is:

1. An input device comprising:
  a base member;
  a motor attached to the base member;
  a rotation shaft configured to be rotated by the motor;
  a worm gear that is configured to be rotated by the rotation shaft and that is attached to the rotation shaft so as to be movable in an axial direction of the rotation shaft;
  a first gear that is provided so as to be rotatable relative to the base member and that is engaged with the worm gear;
  a rotor that is provided so as to be rotatable relative to the base member, that includes a second gear engaged with the first gear, and that is configured to undergo rotation operation performed by an operator;
  a movement member configured to be moved as the worm gear is moved in the axial direction;

an elastic member configured to generate urging force in a direction in which the movement of the movement member is suppressed in accordance with a movement amount of the movement member;

a change amount detection unit configured to detect a change amount of a state that is changed in accordance with the movement of the movement member; and a controller configured to perform drive control for the motor to change a sense of force applied to the operator via the rotor in accordance with the change amount detected by the change amount detection unit.

2. The input device according to claim 1, wherein the rotor is hollow, and the second gear is provided in a rotation direction in an inner circumferential surface of the rotor.

3. The input device according to claim 2, wherein the motor, the worm gear, the first gear, the movement member, the elastic member, and the change amount detection unit are provided inside the rotor.

4. The input device according to claim 1, wherein the elastic member is a spring configured to generate the urging force in directions in which the movement of the movement member due to the movement of the worm gear in a first direction and a second direction in the axial direction is suppressed.

5. The input device according to claim 1, wherein the change amount detection unit is a linear position sensor configured to detect the movement amount of the movement member as the change amount.

6. The input device according to claim 1, wherein the change amount detection unit is a pressure sensor configured to detect pressure applied to the movement member as the change amount.

7. The input device according to claim 1, wherein the motor and the rotation shaft are perpendicular to a rotation central axis of the rotor.

* * * * *